United States Patent [19]

Lawson et al.

[11] Patent Number: 4,598,221
[45] Date of Patent: Jul. 1, 1986

[54] PERMANENT MAGNET MOTOR HAVING ROCKABLE ROTOR MAGNETS

[76] Inventors: William J. Lawson, R.D. 1, Box 299E; Robert J. Lawson, 129 Union St., both of Milton, Del. 19968

[21] Appl. No.: 715,250

[22] Filed: Mar. 25, 1985

Related U.S. Application Data

[63] Continuation-in-part of Ser. No. 693,900, Jan. 23, 1985.

[51] Int. Cl.$^4$ .............................................. H02K 49/00
[52] U.S. Cl. ........................................ 310/103; 91/266
[58] Field of Search ...................... 310/80, 103, 23, 24; 91/266

[56] References Cited

U.S. PATENT DOCUMENTS

| | | | |
|---|---|---|---|
| 3,274,001 | 9/1966 | Yost | 91/266 X |
| 3,636,391 | 1/1972 | Horner et al. | 310/103 X |
| 3,688,136 | 8/1972 | Salverda | 310/103 X |
| 4,196,365 | 4/1980 | Presley | 310/23 |

*Primary Examiner*—Donovan F. Duggan
*Attorney, Agent, or Firm*—B. P. Fishburne, Jr.

[57] ABSTRACT

A self-starting rotational motor capable of providing significant torque in a practical working range is disclosed. The motor employs a magnetic propelling force. The motor is based on the principle of maintaining interacting substantially perpendicular rotor and stator magnet flux fields one within the other without gaps or spacing around the entire circumference of the magnet stator. The rotor magnets are controlled and moved relative to the stator magnets by a mechanism whereby the perpendicular rotor and stator magnet flux fields are maintained constantly in interacting relationship to produce turning of the rotor in one direction.

12 Claims, 8 Drawing Figures

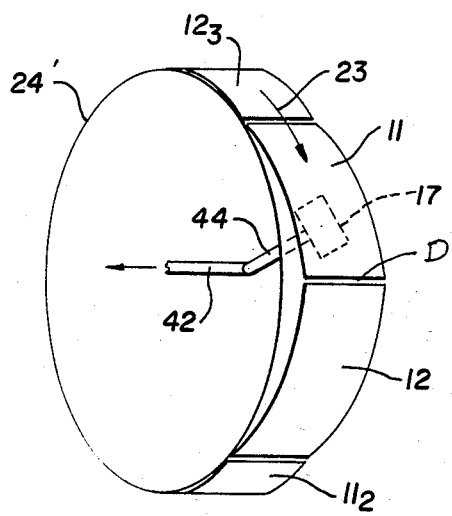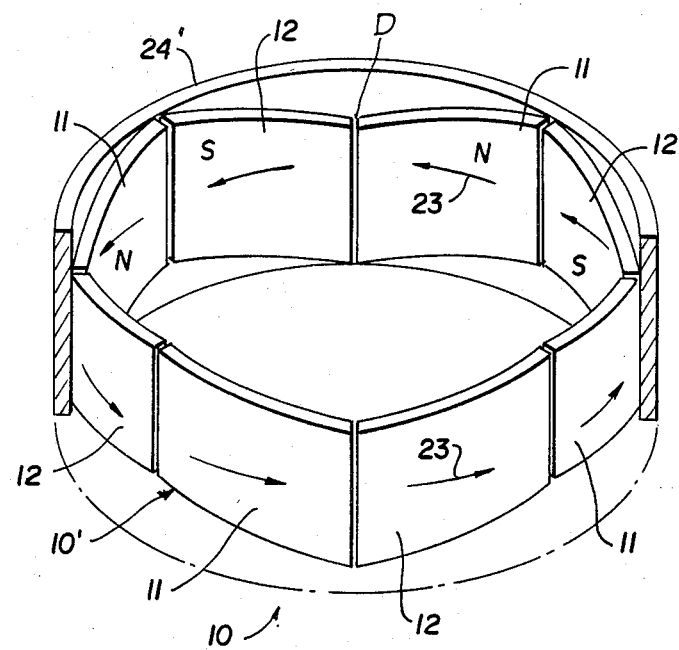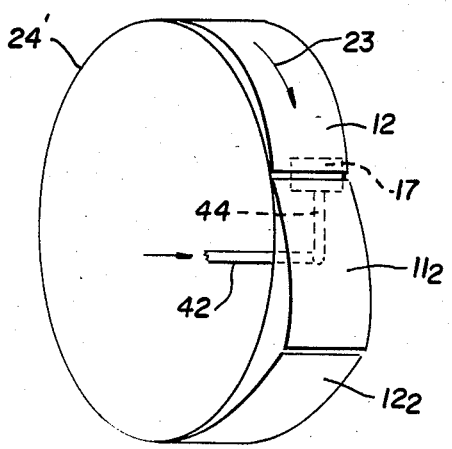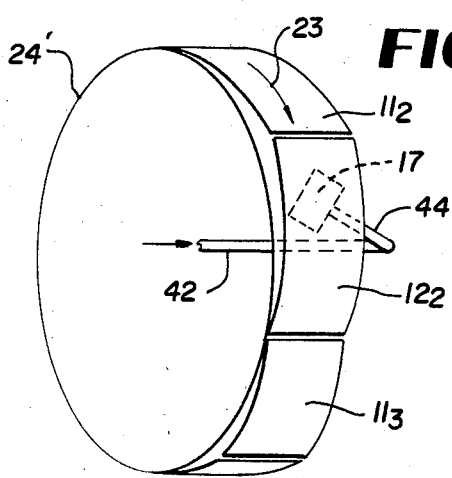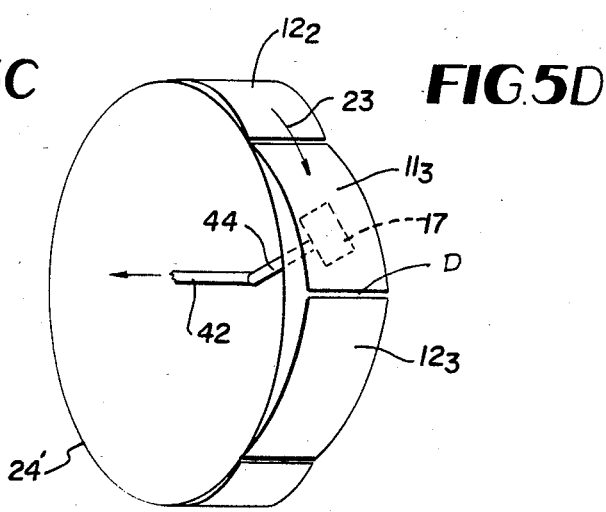

PERMANENT MAGNET MOTOR HAVING ROCKABLE ROTOR MAGNETS

CROSS-REFERENCE TO RELATED APPLICATION

This application is a continuation-in-part of prior copending application Ser. No. 06/693,900, filed Jan. 23, 1985, for PERMANENT MAGNET MOTOR.

BACKGROUND OF THE INVENTION

The objective of this invention is to provide a practical, self-starting, permanent magnet, rotational motor capable of performing significant work through a rotational shaft or the like. Heretofore, permanent magnet motors have met with only limited success in that they have not been self-starting and generally have been operable only as linear motors or actuators and not as rotational devices.

One example of a prior art permanent magnet motor is disclosed in U.S. Pat. No. 4,151,431, and it is an object of this invention to improve significantly on and render more feasible and practical a motor of the class shown in this patent.

A further objective of the invention is to provide a permanent magnet motor whose circumferential sections can be multiplied through a wide range to increase the working power of the motor over a similarly wide range.

Another object of the invention is to provide a completely self-contained permanent magnet motor and integrated rotor magnet movement control system which is relatively simple and feasible from a manufacturing cost standpoint.

Still another object is to provide a permanent magnet motor which will operate efficiently with state-of-the-art permanent magnets including ferrite magnets, magnets formed of ceramics and other existing and future improved permanent magnets.

Other features and advantages of the invention will become apparent to those skilled in the art during the course of the following description.

BRIEF DESCRIPTION OF THE DRAWINGS

FIG. 3 is a perspective view, partly in cross section, of the stator showing the movement path of rotor magnets, not shown.

FIGS. 5A–5D are perspective views, partly schematic, showing stages of the rotational operating cycle of the motor.

DETAILED DESCRIPTION

Heretofore, rotational permanent magnet motors have tended to be unworkable because of obstacles pertaining to the entering and exiting of one magnetic field into and from another yield, due to magnetic repulsion or attraction between the interacting fields. A magnetic cancelling or neutralizing effect results, making rotation of the motor impossible to achieve, or negligible if achieved at all.

With the present invention, it has been discovered that the above difficulties can be overcome and a fully workable permanent magnet rotary motor of a self-starting nature can be realized. Essentially, this is accomplished in the present invention by causing mutually perpendicular interacting magnetic fields of rotor and stator magnet elements to enter one another during relative rotation, by rotating the rotor magnet fields ninety degrees with respect to the interacting stator magnetic fields, as the rotor magnets cross the intersections of the stator magnets. The shorter magnetic fields of the rotor magnets are contained totally within the longer magnetic fields of the stator magnets until the shorter rotor magnet fields completely traverse the longer stator magnet fields during a corner-to-corner pass across the stator magnets. This arrangement eliminates the counterproductive repulsion and attraction between the interacting magnetic fields experienced in the prior art.

It will be seen that in the present invention means is provided to maintain the required interaction between the mutually perpendicular magnetic fields of rotor and stator magnets throughout a complete rotational cycle of the motor.

Figure 1:
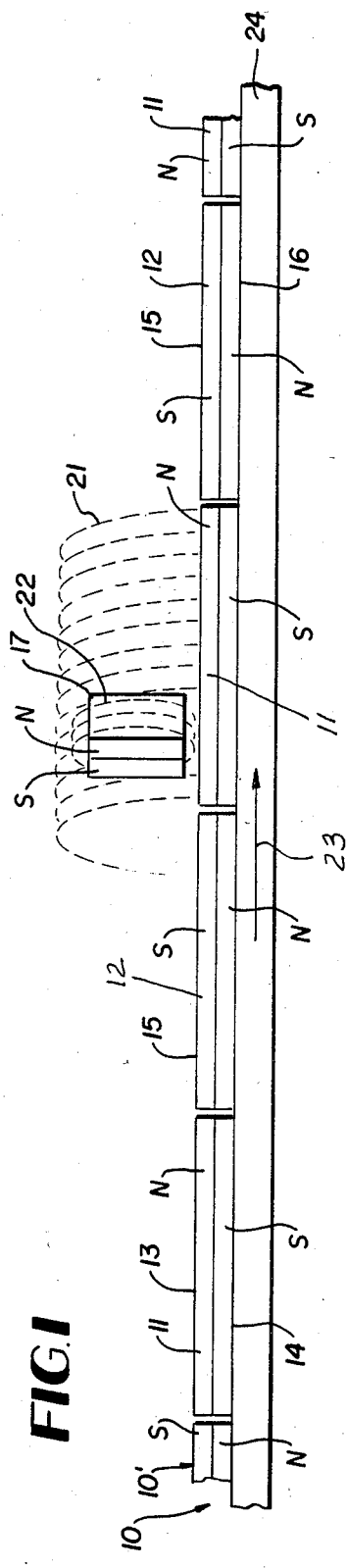
FIG. 1 is a fragmentary partly schematic end elevation of a permanent magnet motor according to this invention wherein the cylindrical stator is laid out flat for ease of illustration of the principal of operation.
Figure 2:
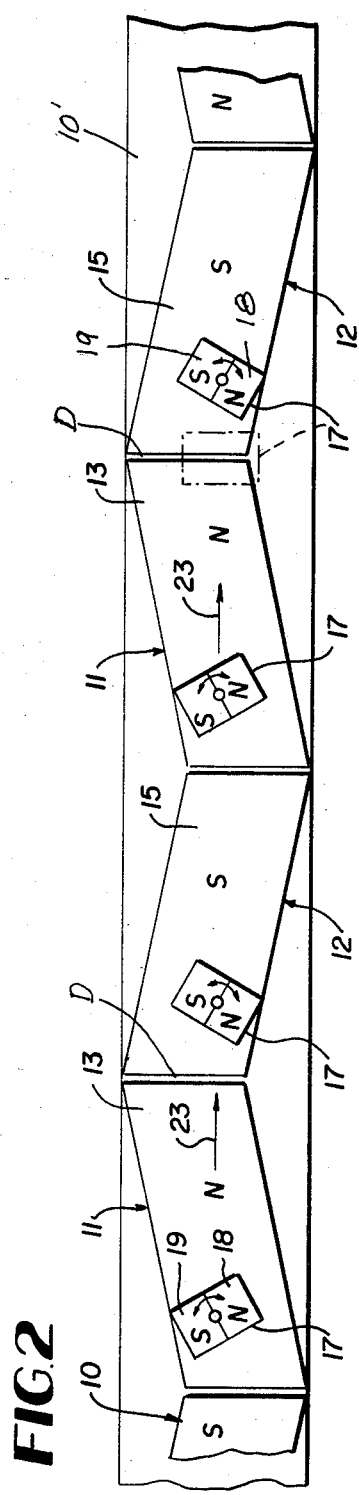
FIG. 2 is an interior side elevation of the motor shown in FIG. 1.

Referring to the drawings in detail, and making reference initially to FIGS. 1 and 2, which show the principal of operation of the motor, a permanent magnet stator 10 is preferably formed by one or more ring sections 10', such as the one shown in FIG. 3. Each stator ring section 10' is composed of a plurality of circumferentially elongated stator permanent magnets 11 of equal lengths, intervened circumferentially of the stator by a like number of arcuate equal length permanent magnets 12.

The stator permanent magnets or segments 11 and 12 have opposite magnetic polarities on their opposite arcuate faces, as shown in FIG. 1. The corresponding faces 13 of stator magnets 11 have one polarity, such as north, and their opposite faces 14 have south polarities. This situation is reversed for the intervening magnets 12, whose faces 15 are of south polarity while their opposite faces 16 are of north polarity.

FIG. 1 further illustrates one coacting rotor magnet 17 in spaced relationship to the interior face of stator 10. The rotor magnet 17 possesses oppositely polarized sides 18 and 19, namely north and south poles, which respectively attract and repel magnetically while in a run position relative to the south polarized faces 15 of stator magnets 12. This attraction and repulsion causes the stator magnets 11 and 12 to drive the rotor 24 rotationally in the direction of the arrow 23, FIGS. 1 and 2.

Also shown in FIG. 1 are mutually perpendicular interacting magnetic flux fields 21 and 22 for one of the stator magnets 11 and one rotor magnet 17. It can be seen that the magnetic flux field 21 extends for the full length and width of the stator magnet 11, and the flux lines of the field 21 are across the long axis of the stator magnet 11.

The perpendicular field 22 of rotor magnet 17 is considerably shorter circumferentially of the stator 10 than the field 21, whereby the shorter field 22 during rotor rotation can enter the field 21 and can be totally contained therein while the rotor 24 is turning for a significant distance. By the time the shorter field 22 exits the field 21, the field 22 will have rotated 90° and will already be entering the field 21 of the next upcoming stator magnet, in order to continue powered rotation of the rotor 24.

Figure 8:
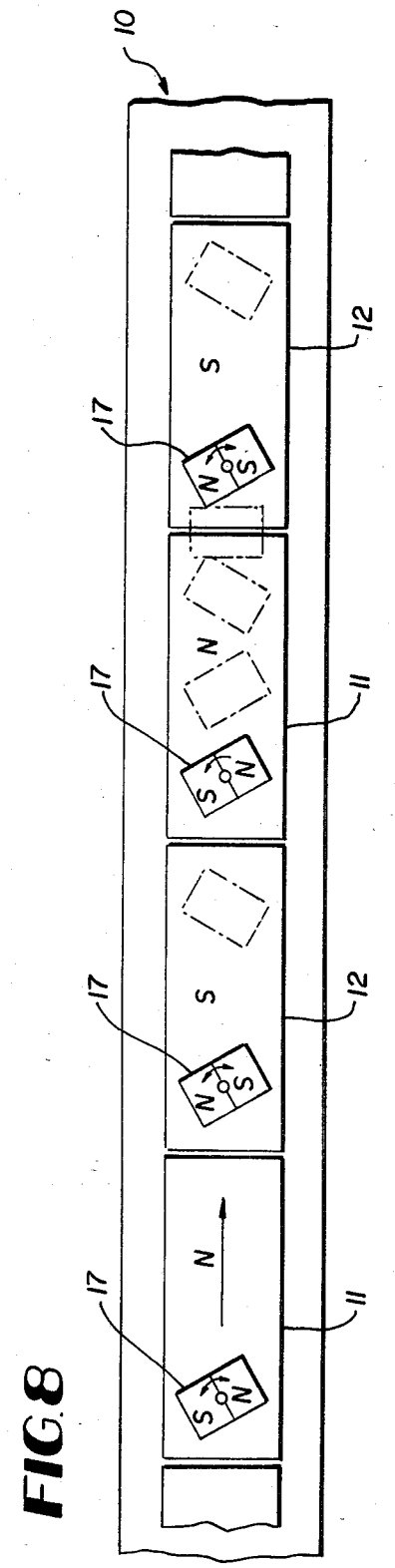
FIG. 8 is a view similar to FIG. 2 showing a variant of the invention.

FIG. 2, like FIGS. 1 and 3, shows that the stator ring 10' is composed of a plurality of stator magnets 11 and intervening magnets 12. The magnets 11 and 12 are staggered around the circumference of the ring 10' end-to-end in a zigzag manner, FIGS. 2 and 3. This arrangement enhances rotational operation of the motor, as will be further described, although a straight line arrangement of stator magnets can be successfully employed, as depicted in FIG. 8.

FIG. 2 shows one rotor magnet 17 in different positions over the stator magnets 11 and 12 of opposite polarities and also shows at 23 the movement path of the rotatably shiftable rotor magnet 17 relative to stator magnets 11 and 12 during the rotational cycle of the motor. The rotor magnets 17 are under control of a mechanical movement means shown in FIGS. 4 and 6. FIG. 2 shows that, while the rotor 24 is turning in the direction of the arrow 23, the rotor magnets 17 following the path 23 pass somewhat diagonally across the stator magnets 11 and 12, approximately from corner-to-corner thereof. This same movement path is depicted in FIG. 3, although the rotor magnets 17 are omitted in FIG. 3 for simplicity of illustration.

The stator magnets 11 and 12 of each annular stator ring 10' are fixed on the interior surface of a sized steel cylindrical stator shell 24'. Any number of the stator ring sections 10' may be fixed to the shell 24' depending on power requirements to be satisfied by the motor. The arrangement in FIG. 3, showing a single stator ring, results in total magnetic field circumferencing of the stator without gaps or spaces, and without the rotation cancelling effects of the prior art which attempts to employ continuous hoop-like magnets of one polarity.

Figure 4:
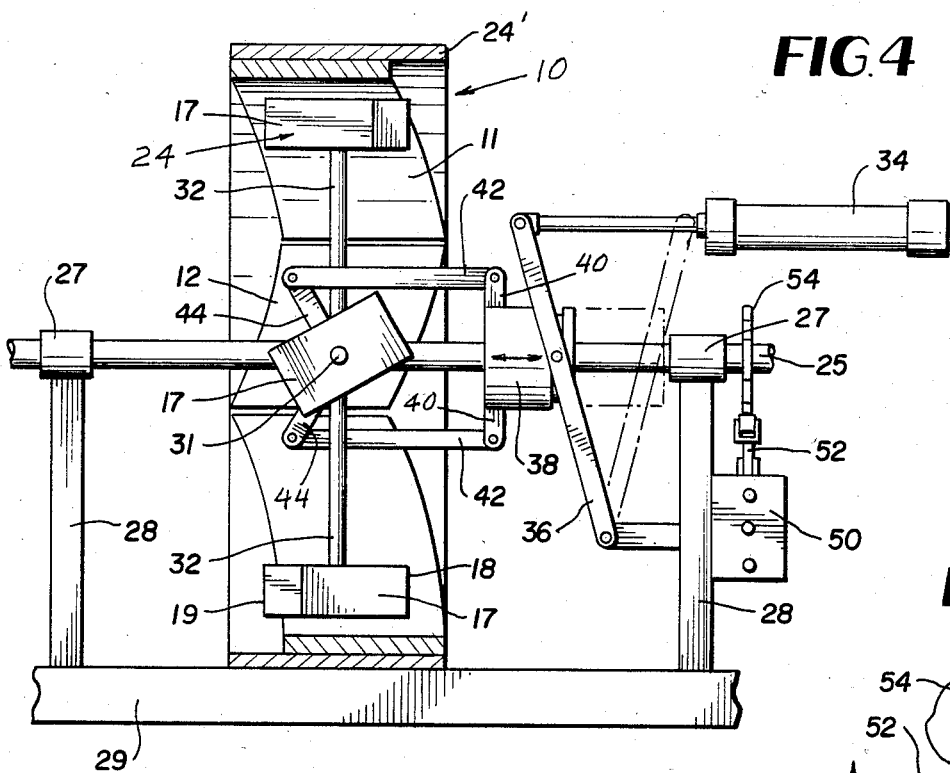
FIG. 4 is a side elevation of the motor including the rotor magnet rotating means and associated elements, parts in section.
Figure 7:
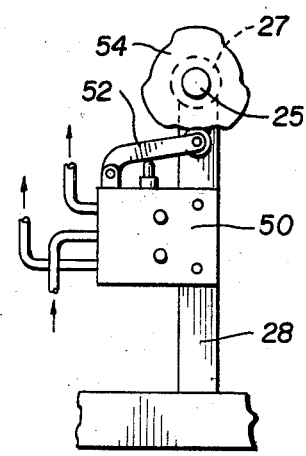
FIG. 7 is a fragmentary end elevation of the motor showing a four-way valve, cam follower arm and rotary cam.

As shown in FIG. 4, the rotor 24 is fixed on a power shaft 25. Rotor rotation turns the shaft 25, through which work may be done in any required manner. The shaft 25 is journaled in stationary bearings 27, attached to end members 28 of a stationary frame 29. The shaft 25 extends coaxially through the rotor 24 composed of the rotor permanent magnets 17, which magnets are rotatably shiftable or rockable between motor running and nonrunning positions, shown respectively in FIGS. 4 and 6. The rotor magnets 17 are rotated 90° or more in either direction from one extreme to the other as shown by the directional arrows in the drawings.

The rotor magnets 17, FIG. 4, are held on rotating support arms 32, perpendicular to the axis of shaft 25 and spaced therefrom. An air cylinder 34 acts on a yoke 36 which is actively engaged with an axially slidable block 38. The block 38 is keyed to the shaft 25 to rotate therewith while being axially slidable thereon, as indicated by the arrows in FIG. 4. Arms 40 on the block 38 are connected with links 42 which correspond in number to the rotating support arms 32 and rotor magnets 17. The arms 32 have perpendicular cranks 44 mounted thereon which are engaged with the links 42. The arrangement enables rotational movement of the rotor magnets 17 on the longitudinal axes of the arms 32 when air pressure is applied to the cylinder 34 to activate the yoke 36, block 38 and links 42.

When the rotor 24 is driving the power shaft 25, the air cylinder 34 is being operated by a four-way valve 50 and cam follower arm 52, riding on a cam plate 54 fixed to shaft 25. This causes the yoke 36 and block 38 and associated elements 40, 42, 44 to produce oscillating rotary movement of rotor magnets 17. This causes magnets 17 to traverse stator magnets 11 on a corner-to-corner path and to enter the magnetic fields of stator magnets 12 along the movement path 23, FIGS. 2 and 3.

The mutually perpendicular magnetic fields 21 and 22 interact in a continuous repetitive manner to promote single directional rotation of the rotor 24 when the rotor magnets 17 are rotatably shifted by the cylinder 34, as described. The arrangement causes the magnetic fields 21 of the stator to act continuously on the perpendicular fields 22 of the rotor magnets 17.

OPERATION

Referring to FIG. 5, position A, rotor 24 is being propelled in the direction of arrow 23 by the interaction of the magnetic fields of rotor magnets 17 and stator magnets 11. Such rotation is enhanced by the simultaneous attraction and repulsion between the rotor magnets 17 and stator magnets 12 of opposite face polarities from the stator magnets 11.

As rotation continues in FIG. 5A, rotor magnet 17 approaches stator magnet 12. In FIG. 5, position B, the block 38 and associated linkage rotates the rotor magnet 17 on the axis of its support arm 32, causing it to cross stator magnet $11_2$ in a corner-to-corner fashion, FIG. 5B.

As rotor rotation continues due to continued interaction of perpendicular magnetic flux fields 21 and 22, along with the attraction and repulsion boosting action of stator magnets 12, rotor magnet 17 approaches stator magnet $12_2$, FIG. 5B. As rotor magnet 17 approaches stator magnet $12_2$ at the intersection between stator magnets $11_2$ and $12_2$, the block 38 and linkage rotates rotor magnet 17 to reset the polarity in order to traverse in a corner-to-opposite-corner path above stator magnet $12_2$, FIG. 5C, as the rotor continues to turn on the path 23.

Figure 6:
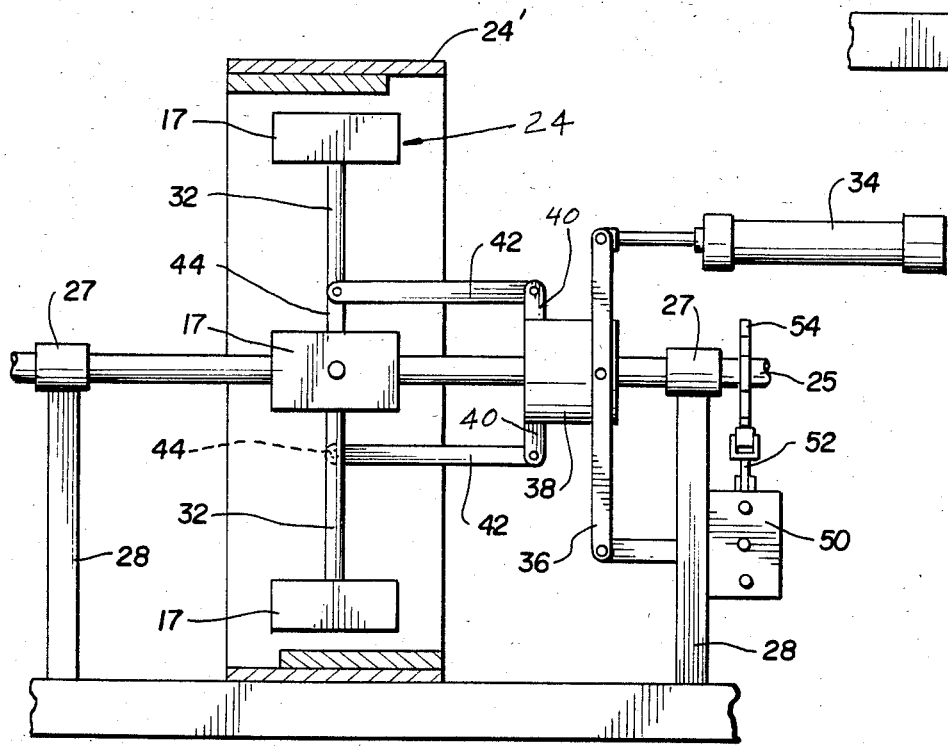
FIG. 6 is a view similar to FIG. 4 showing the rotor magnets control mechanism in a non-run position on the motor shaft.

As rotor rotation continues, FIG. 5, position D, is approached, completing the rotational cycle of the motor. The relative locations of stator magnets 11 and 12, together with the locations of rotor magnets 17, enable the rotor to be self-starting when the arms 44 are in the run position shown in FIG. 4. When the arms 44 are in the no-run position shown in FIG. 6, the rotor magnets 17 seek their natural positions of equilibrium relative to the stator magnets 11 and 12, thereby cancelling the thrust effect of the magnetic fields 21 and 22. As shown in FIG. 6, the rotor magnets 17, at this time, are parallel to the axis of shaft 25, rather than diagonally oriented in the run position shown in FIG. 4.

Means other than the cylinder 34, reciprocating block 38, and associated linkage can be employed to reverse the polarities of the rotor magnets 17. In some cases, the rotor magnets can be turned end-over-end in rotation, instead of being rocked 90° back and forth on the axes of arms 32.

The rotor magnets 17 can be rotated continuously in one direction as long as they rotate 180° per stator magnet 11, and the perpendicular magnetic fields between the rotor and stator magnets are maintained 90° out of phase, as in FIG. 2; at the intersection D, there is zero circumferential pull as each rotor magnet 17 crosses the intersection of two adjacent oppositely polarized stator magnets 11 and 12. The rotor magnet 17 is shown in broken lines as it would be positioned at the intersection D, FIG. 2.

The rocking or rotation of each rotor magnet 17 on the axis of its radial carrier arm 32 always takes place as the rotor magnet crosses one of the intersections D between adjacent stator magnets 11 and 12.

The number of rotor magnets 17 may equal the number of stator magnets; thereby, due to the shifting of all of the rotor magnets 17 simultaneously by the mechanism shown in FIG. 4, alternate rotor magnets will have their polarities reversed as depicted in FIG. 8.

Other mechanisms or means can be employed to produce the necessary rocking or shifting of the rotor magnets 17 including cam means.

Reversal of rotor rotation is achieved by rotating the cam plate 54 mounted on the shaft 25 60°. The speed and power of rotation of the motor is controlled by the amount of fluid pressure applied to cylinder 34, which in turn through the associated linkage of FIG. 4 increases or decreases the extent of rocking movement of the rotor magnets 17 around the axes of arms 32.

With the proper number of stator magnet 11 and 12 in the zigzag arrangement shown in FIGS. 2 and 3 and the proper number of rotor magnets 17 arranged so that a minimum number of the latter are crossing the intersections D at any given time, it is possible to induce rotation of the rotor with an absolute minimum of external power applied to the rotor to start it.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A permanent magnet motion conversion device comprising a ring stator including a plurality of circumferentially extending and circumferentially spaced stator magnets having exterior and interior faces of opposite magnetic polarities, a like number of circumferentially extending stator magnets intervened circumferentially with the first-named stator magnets and having exterior and interior faces of opposite polarities which are also opposite to the polarities of the first-named stator magnets, at least a rotor permanent magnet adapted to be driven by the stator permanent magnets and having radially disposed side faces of opposite magnetic polarities, the rotor magnet between its side faces extending substantially axially of the stator, at least the first-named stator magnets and the rotor magnet having mutually perpendicular magnetic flux fields of such relative sizes that the flux field of the rotor magnet may enter and be contained wholly within the flux field of each first-named stator magnet during rotor rotation, and means carrying the rotor magnet on its path of rotation and including an associated power mechanism to rotate the rotor magnet around a radial axis in opposite directions as the rotor magnet traverses each stator magnet in succession on its circumferential path of movement relative to the stator.

2. A permanent magnet motion conversion device as defined in claim 1, wherein said first-named and said like number of stator magnets are positioned in a zigzag configuration around the circumference of the stator, whereby the rotating rotor magnet during its circumferential movement traverses the stator magnets substantially across diagonally opposite corner portions thereof.

3. A permanent magnet motion conversion device as defined in claim 2, and a plurality of rotor permanent magnets held in circumferentially equidistantly spaced relationship relative to the ring stator and each rotor permanent magnet being rotated around a radial axis in opposite directions by said power mechanism while the rotor magnet is on its path of rotation circumferentially of the stator.

4. A permanent magnet motion conversion device as defined in claim 3, and said means carrying the rotor magnets comprises radial support arms for the rotor magnets, a linkage connected with said arms to turn them in opposite directions on their radial axes, and said power mechanism comprising a linear actuator, a pivoted yoke connected with and operated by the linear actuator and a reciprocatory element forming a part of said linkage and being operatively connected with said yoke.

5. A permanent magnet motion conversion device as defined in claim 4, and said reciprocatory element being drivingly connected to a rotary power shaft of the motor to turn such shaft and be axially shiftable thereon by said yoke.

6. A permanent magnet motion conversion device as defined in claim 5, and a rotary timing means on said output and turning therewith and being operatively connected with the linear actuator to control the operation of the same.

7. A permanent magnet motion conversion device as defined in claim 6, and said linear actuator comprising a fluid pressure operated power cylinder, and said rotary timing means comprising a lobed cam on said output shaft, a valve controlling the passage of pressurized fluid to and from said power cylinder, and an actuator arm for said valve having an element engaging and following the profile of the lobed cam.

8. A permanent magnet motion conversion device comprising a ring stator including a plurality of circumferentially extending stator magnets having exterior and interior faces of opposite magnetic polarities, at least a rotor permanent magnet adapted to be driven by the stator permanent magnets and having radially extending side faces of opposite magnetic polarities, the stator and rotor magnets having mutually perpendicular magnetic flux fields of such relative sizes that the flux field of the rotor magnet may be contained wholly within the flux field of each stator magnet during rotor rotation, a power output shaft for the device extending coaxially of the ring stator, a driving element for said shaft splined thereon to turn therewith and to shift axially of the shaft, means carrying the rotor magnet including a radial arm rotatable with the rotor magnet around a radial axis during rotation of the rotor magnet relative to the ring stator, a linkage means connected between the radial arm and said driving element whereby the latter during axial shifting can rotate the radial arm with the rotor magnet around said radial axis, and a linear actuator means connected with said driving element to shift it axially of said shaft.

9. A permanent magnet motion conversion device as defined in claim 8, and said stator magnets being arranged said ring stator in end-to-end relationship on a zigzag path circumferentially of the ring stator, whereby the rotor magnet during rotation on a circumferential path traverses each stator magnet substantially diagonally across a pair of corners thereof.

10. A permanent magnet motion conversion device as defined in claim 9, and said linkage means including a crank arm on said radial arm and being swingable in opposite directions on said radial axis by said linear actuator means to rotate the rotor magnet in opposite directions substantially 90° relative to each stator magnet when the rotor magnet is traversing the adjacent ends of the stator magnets while moving on a circumferential path relative to the ring stator.

11. A permanent magnet motion conversion device as defined in claim 1, and the first-named stator magnets having equal lengths circumferentially of the ring stator, and said like number of stator magnets also having equal lengths circumferentially and having the same lengths as the first-named stator magnets.

12. A permanent magnet motion conversion device as defined in claim 11, and a cylindrical stator shell on which all of the stator magnets are fixedly mounted.

* * * * *